United States Patent [19]
Jordan

[11] 3,747,303
[45] July 24, 1973

[54] AIR-FILTER AND CARBON-BED ELEMENT FOR AN AIR CLEANER ASSEMBLY
[75] Inventor: Robert K. Jordan, Flint, Mich.
[73] Assignee: General Motors Corporation, Detroit, Mich.
[22] Filed: June 1, 1971
[21] Appl. No.: 148,521

[52] U.S. Cl. ................................. 55/318, 55/387
[51] Int. Cl. ............................................. B01d 53/04
[58] Field of Search ............... 55/316, 387, DIG.30, 55/318

[56] References Cited
UNITED STATES PATENTS
3,368,326   2/1968   Hervert ............................... 55/316
3,572,014   3/1971   Hansen ............................... 55/316

Primary Examiner—Charles N. Hart
Attorney—E. W. Christen, J. L. Carpenter and R. L. Phillips

[57] ABSTRACT

A ring of activated carbon particles for adsorbing and desorbing hydrocarbon vapors rising from a fuel reservoir in a carburetor of an internal combustion engine. The ring has an elevated portion above a base portion. Both portions extend between an air inlet side and an air outlet side and between top and bottom surfaces for securing and sealing the ring across the air path through an air cleaner. The elevated portion has passages that conduct air for the normal operation of the engine from the air inlet side of the ring to the air outlet side. Hydrocarbon vapors adjacent the outlet side from the carburetor are adsorbed by the carbon in the base and elevated portions before rising to the level of the passages. With the engine running, the vapors previously adsorbed are desorbed by air flowing from the inlet to the outlet side of the air cleaner into the carburetor.

3 Claims, 3 Drawing Figures

PATENTED JUL 24 1973 3,747,303

INVENTOR
Robert K. Jordan
BY
Ronald L. Phillips
ATTORNEY

AIR-FILTER AND CARBON-BED ELEMENT FOR AN AIR CLEANER ASSEMBLY

This invention relates to hydrocarbon-vapor adsorption and desorption means for the air cleaner of an internal combustion engine where such means are of the type having an elevated adsorption portion having therethrough a passage to conduct air to the engine.

It is known to reduce the emission of hydrocarbon vapors from fuels to the ambient atmosphere by venting the reservoirs of such fuel, such as the float bowl section of a carburetor or, to the air mixing chamber of the carburetor where such hydrocarbon vapors may be mixed with air and burned in the engine. However, when the engine does not operate, such vapors unless otherwise adsorbed could escape to the atmosphere. To effect the necessary adsorption, a bed of activated carbon particles may be placed between the air inlet and outlet ports of an air cleaner assembly attached to the carburetor. The carbon bed, however, should not interfere with the cleaning of the ambient air by the air filter nor should it introduce pressure drops affecting the conduction of cleaned air to the carburetor. Moreover, to avoid being broken into its composite particles and being drawn into the intake manifold of the engine, the carbon bed should not be free to vibrate about the interior of the air cleaner. Also, to reduce part inventories and to facilitate servicing, it is desirable to integrate the carbon bed with the conventional air filter and to place the resulting elements in a position in the air cleaner permitting the most efficient use of the carbon particles.

These and other features are obtained in the present invention by an air-filter carbon-bed cartridge for insertion across the path of air through an air cleaner assembly. The cartridge comprises an air filter ring that surrounds a ring of activated carbon particles. Both rings are bonded between a pair of end caps for sealing and supporting the resulting element between the roof and floor of an air cleaner assembly and across the path of air therethrough. For adsorbing the heavier-than-air fuel vapors as they rise from the carburetor the carbon ring has a base portion and an elevated portion thereabove. The elevated portion has passages therethrough to permit air required for the normal operation of the engine to flow substantially unrestricted from the air inlet port of the air cleaner to the air outlet. The base and elevated portions cooperate to adsorb the hydrocarbon vapors before they rise to the level of the passages. Air flowing from the inlet to the outlet ports of the air cleaner during subsequent operation of the engine desorbs the vapors adsorbed by the base and elevated portions of the ring. To assure that the element is insertable into the air cleaner only with the base portion below the passages, the end cap over the elevated portion has a flange that would interfere with a lip extending from the floor of the cleaner if an up-side-down insertion of the element were attempted.

It is therefore a primary object of the present invention to provide a new and improved air-filter carbon-bed cartridge for an air cleaner assembly of a carburetor for an internal combustion engine.

It is another primary object of the present invention to provide a ring of activated carbon particles that has an elevated portion having a passage therethrough to conduct air required for normal operation of the engine and a base portion that cooperates with the elevated portion to adsorb hydrocarbon vapors before they rise to the level of the passage.

It is a further object of the present invention to surround a carbon ring of the foregoing type with a cylindrical air filter and affix both to an end cap for securing the resulting cartridge in an air cleaner and sealing the cartridge across the path of air through the cleaner.

These and other features, objects, and details of the present invention will become more apparent with references to the following description thereof taken in conjunction with the following drawings wherein.

Figure 1:
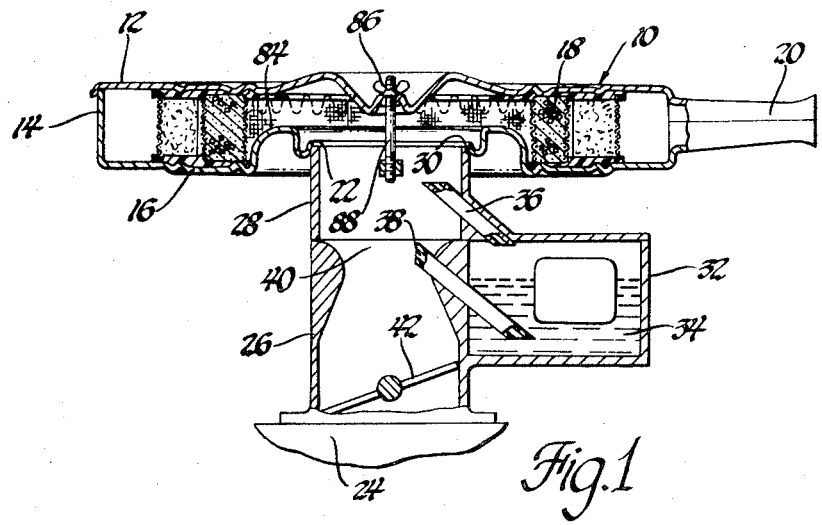
FIG. 1 is a cross-sectional view of an air cleaner assembly mounted on a carburetor and embodying the air-filter and carbon-bed element of the present invention.

Referring now to FIG. 1, there is shown a conventional air cleaner 10 having a cover or roof 12 sealingly secured to the side 14 of a carburetor-connector plate or floor 16 and containing air-filter and carbon-bed element or cartridge 18 of the present invention inserted between a snorkel-type air inlet 20 in side 14 and an air outlet 22 in floor 16. Air cleaner 10 is connected to a conventional carburetor 26 on an internal combustion engine 24 and comprises an air horn 28, the rim 30 of which receives air outlet port 22 of assembly 10. Carburetor 26 has a float bowl 32 containing fuel 34 vented to air horn 28 by a tube 36 and drawn through a venturi tube 38 to venturi area 40 at a rate determined by the setting of throttle valve 42.

Figure 2:
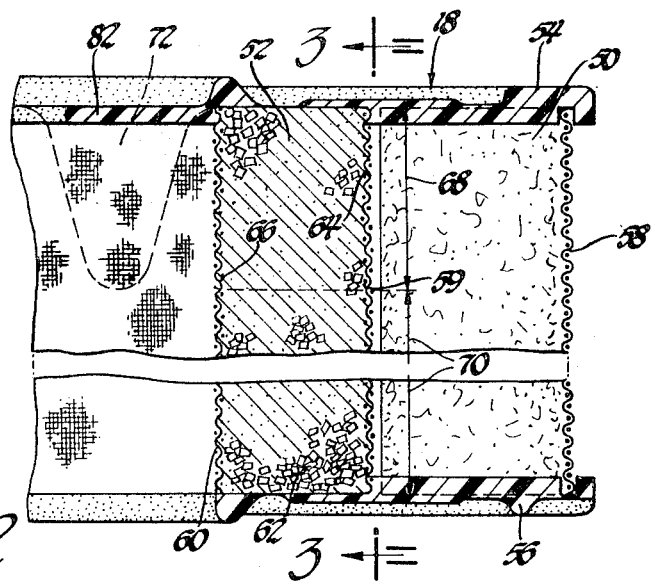
FIG. 2 is an enlarged cross-sectional view of the air-filter and carbon bed element of FIG. 1.

As may be seen in greater detail in FIG. 2, air-filter and carbon-bed element 18 comprises a conventional folded-paper air filter ring 50 and a carbon ring 52, the opposite axial ends of which are secured between annular top and bottom end caps 54 and 56, here molded from a suitable plastic. The air inlet side of filter 50 is bounded by a screen 58 to lend rigidity to the assembly and protect the paper folds and the air outlet side surrounds air inlet side 59 of carbon ring 52. Carbon ring 52 is comprised of activated carbon particles 62, here of a 6 × 16-mesh charcoal, only the proximate tips of which are secured by a polyethylene binder to leave substantial surface area for hydrocarbon adsorption and inter-particle volume for air passage. To further support particles 62 and prevent those that might break away from ring 52 from possibly being drawn into the engine 24 or clogging the filter 50, inlet side 59 of ring 52 is bounded by one screen 64 and outlet side 60 by another screen 66, such screens here being a 14-mesh 0.011 inch diameter galvanized wire.

Figure 3:
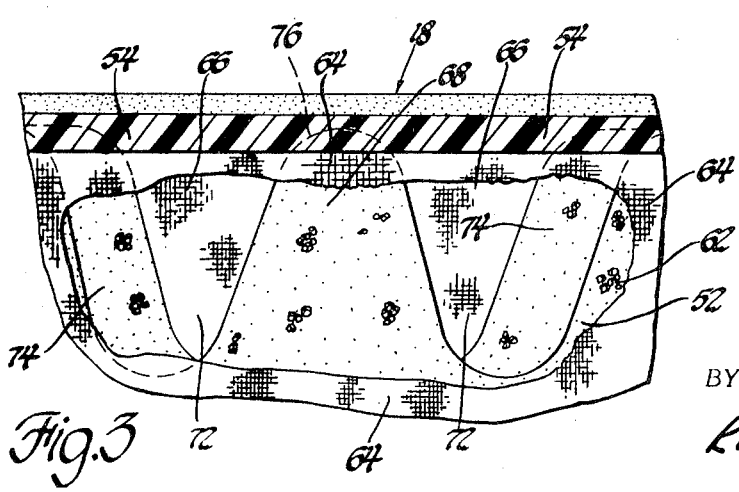
FIG. 3 is an enlarged cross-sectional view taken along section 3—3 of FIG. 2 and showing the elevated air passages contoured through and about the top portion of the carbon bed.

Carbon ring 52 further comprises a top axial portion 68 having a plurality of passages 72 contoured circumferentially thereabout and radially therethrough and elevated above a base portion 70. As may be seen more clearly with reference to FIG. 3, passages 72 are defined by walls 74 extending axially about one-third of the axial length of ring 52 and radially the thickness of ring 52 between inlet side 59 and outlet side 60. The tips of walls 74 are secured to top end cap 54 and, when inserted in air cleaner 10, place base and top portions 68 and 70 transversely across the path of air flowing from inlet 20 to outlet 22 to permit desorption of hydrocarbon vapors previously adsorbed. Passages 72, however, provide a sufficient combined cross-sectional area to allow air for operation of engine 24 to flow substantially unrestricted across carbon ring 52 from air filter 50 to outlet 22.

To assure that base portion 70 of carbon ring 52 is mounted on floor 16 of housing 10, end cap 54 bonded to the tips 76 of walls 74 has a flange 82 extending radially inwards over a lip or bump 84 extending about outlet 22 in housing floor 16 towards cover 12 and functioning to lower cover 12 and floor 16 relative to the height of the engine. Flange 82 would interfere with lip 84 should an attempt be made to insert element 18 with passages 72 adjacent floor 16. In addition to providing such means for the proper insertion, end caps 54 and 56 also permit element 18 to be sealed against cover 12 and floor 16 when roof 12 is pulled against sides 14 by wing nut 86 acting against a bolt 88 fastened in air horn 28. In this manner, end caps 54 and 56 cooperate with roof 12 and floor 16 to prevent a possible bypass of dirty air into the engine. They also secure element 18 against vibrations relative to housing 10 that might otherwise break up carbon particles 62 and possibly allow them to be drawn into the engine 24. Moreover, by integrating air filter 50 and carbon ring 52 into the same element 18, end caps 54 and 56 also reduce the number of different parts that must be kept in inventory.

With the engine not running or idling slowly, hydrocarbon vapors are emitted through vent tube 36 from float bowl section 32 at a rate determined primarily by the change in ambient temperature. Being heavier than air, such hydrocarbon vapors first fill the venturi area 40 above the throttle valve 42 and then air horn 28. They then back up onto the floor 16 of housing 10 adjacent outlet side 60 of ring 52. The activated carbon particles 62 comprising base and top portions 70 and 68 thereafter adsorb their own weight in fuel vapors and cooperate to prevent the level of fuel vapors from reaching the bottom of air passages 72 and possibly escaping therethrough and filter 50 to the atmosphere. Hydrocarbon vapors adsorbed by carbon ring 52 during hot soak periods are readily desorbed or "purged" therefrom when air for operation of the engine 24 is subsequently drawn through inlet means 20 and air filter 50 to be mixed with fuel 34 from bowl 32. A substantial portion of the hydrocarbon vapors adsorbed by ring 50 is desorbed therefrom by air flowing through ring 50 between carbon particles 62 thereof, and the remaining portion is desorbed by air flowing adjacent inlet side 59, walls 74 of passages 72, and outlet side 60.

Having described one embodiment of the present invention, it is understood that the specific terms and examples are employed in a descriptive sense only and not for purposes of limitation. Other embodiments of the invention, modifications thereof, and alternatives thereto may be used. I therefore aim in the appended claims to cover such modifications and changes as fall within the true spirit and scope of my invention.

What I claim as new and desire to secure by Letters Patent of the United States is:

It is claimed:

1. An air-filter and hydrocarbon-vapor adsorbing and desorbing cartridge for insertion in the air path between air inlet means and air outlet means of an air cleaner assembly of a carburetor for an internal combustion engine comprising:

a. an air filter ring having an air inlet side spaced radially about an air outlet side for removing foreign matter from the air flowing from said air inlet means to said air outlet means of said air cleaner assembly;

b. a carbon ring comprising activated carbon particles secured by suitable binder means, said ring having top and bottom surfaces and radially spaced air inlet and air outlet sides, i. said carbon ring being spaced radially within said air outlet side of said air filter and being insertable into said air cleaner assembly with said outlet side of said ring adjacent said air outlet means of said air cleaner assembly, ii. said carbon ring comprising an elevated portion above a base portion, said elevated portion having a plurality of axially extending passages formed by said top surface for conducting air from said air inlet side of said ring to said air outlet side thereof, said elevated and base portions cooperating to adsorb hydrocarbon vapors entering said air cleaner assembly adjacent said air outlet side of said ring from said carburetor through said outlet means of said air cleaner to prevent said vapors from escaping through said inlet means of said air cleaner; and c. end caps means secured to said air filter and said top and bottom surfaces only of said carbon ring for forming a unitary cartridge theretogether and for sealing said cartridge against said air cleaner assembly across said air path therethrough.

2. An air cleaner assembly for a carburetor of an internal combustion engine comprising:

a. a housing having a roof, a floor, and a side therebetween, said side having air inlet means, and said floor having air outlet means for communicating with a fuel reservoir emitting hydrocarbon vapors;

b. a carbon ring comprising activated carbon particles secured by suitable binder means, said ring having a top surface, a bottom surface, and radially spaced air inlet and air outlet sides, said top and bottom surfaces having therebetween an elevated portion above a base portion, said elevated portion having a plurality of passages formed by said top surface spaced circumferentially thereabout and passing radially therethrough for communicating air to said carburetor from said inlet means through said outlet means, said elevated and base portions cooperating to adsorb hydrocarbon vapors emitted from said reservoir and adjacent said outlet side of said ring to prevent said vapors from escaping from said housing;

c. air filter means for cleaning air flowing between said air inlet and air outlet means and for conducting air through said passages for normal operation of said internal combustion engine and through said elevated and base portions for desorbing hydrocarbon vapors previously adsorbed therein from said fuel reservoir; and d. end cap means for forming a unitary cartridge of said air filter and said carbon ring and for securing and also sealing said cartridge between said roof and floor of said housing completely across the path of air flowing from said inlet means to said outlet means.

3. An air cleaner assembly for a carburetor of an internal combustion engine comprising:

a. a housing having a roof and a floor with a side therebetween, said side having air inlet means, said floor having central air outlet means for communication with the carburetor and a raised lip surrounding said central air outlet means, and
b. a unitary air-filter and carbon-bed cartridge comprising upper and lower axially spaced annular end caps with a radially outer annular air-filter element and a radially inner annular carbon-bed element secured therebetween, the unitary air-filter and carbon-bed cartridge being held in the housing between the roof and floor thereof with the upper end cap sealingly engaging the roof and the lower end cap sealingly engaging the floor radially outward of the raised lip, i. said annular carbon-bed element comprising carbon particles secured by suitable binder means for the adsorption therein of hydrocarbon vapors emitted from said carburetor and the desorption therefrom of said vapors by air drawn therethrough to the carburetor and having one or more circumferentially spaced radially extending passages therethrough adjacent the upper end cap for the substantially unimpeded flow of air therethrough, and
ii. said upper end cap having a flange extending radially inward therefrom over said lip, whereby said air-filter and carbon-bed cartridge cannot be inserted in the housing upside down.

* * * * *